May 2, 1967  R. A. NELSON  3,316,764
RADIATION PYROMETER AND TEMPERATURE STANDARD THEREFOR
Filed May 12, 1964  3 Sheets-Sheet 3

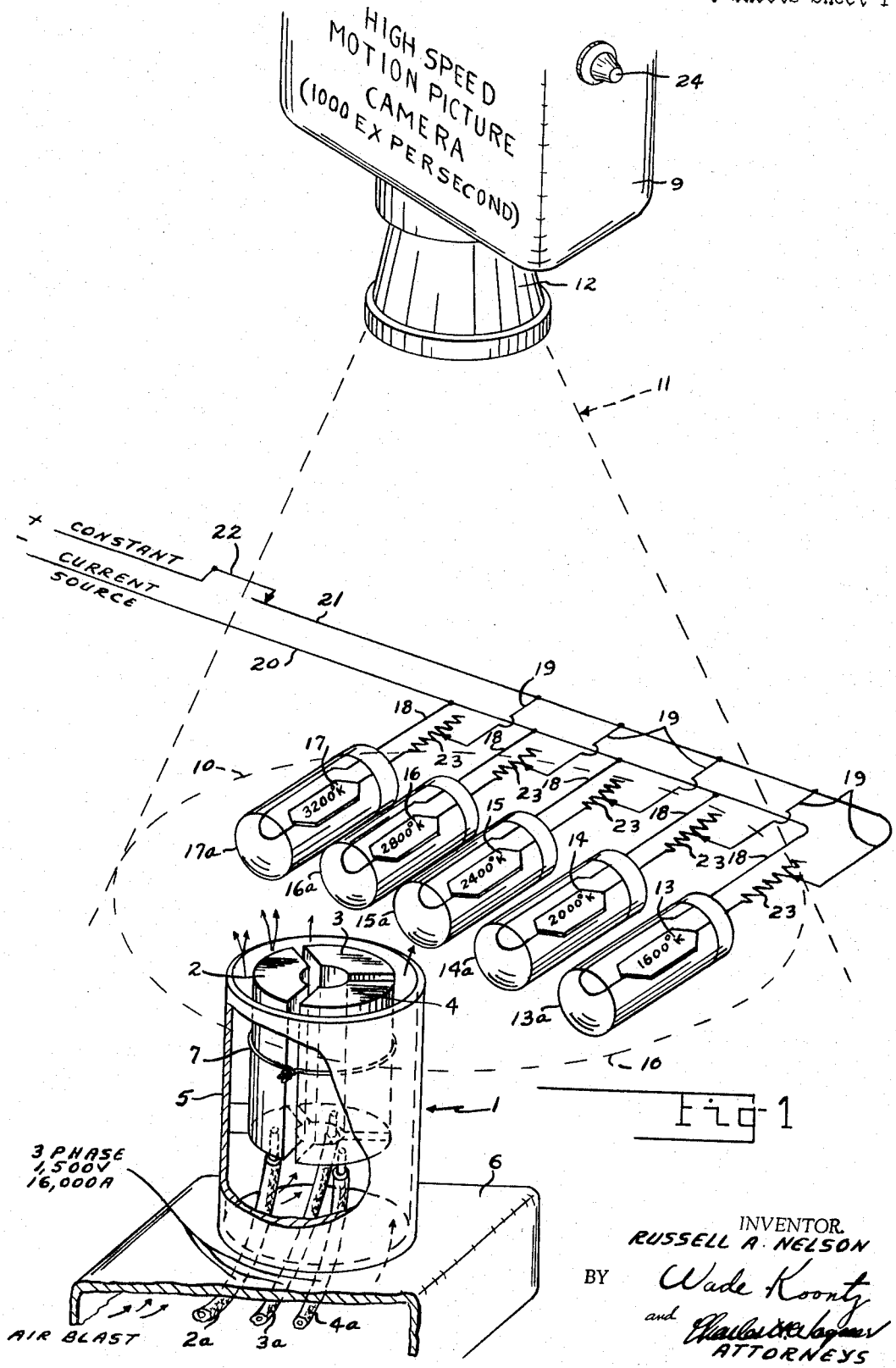

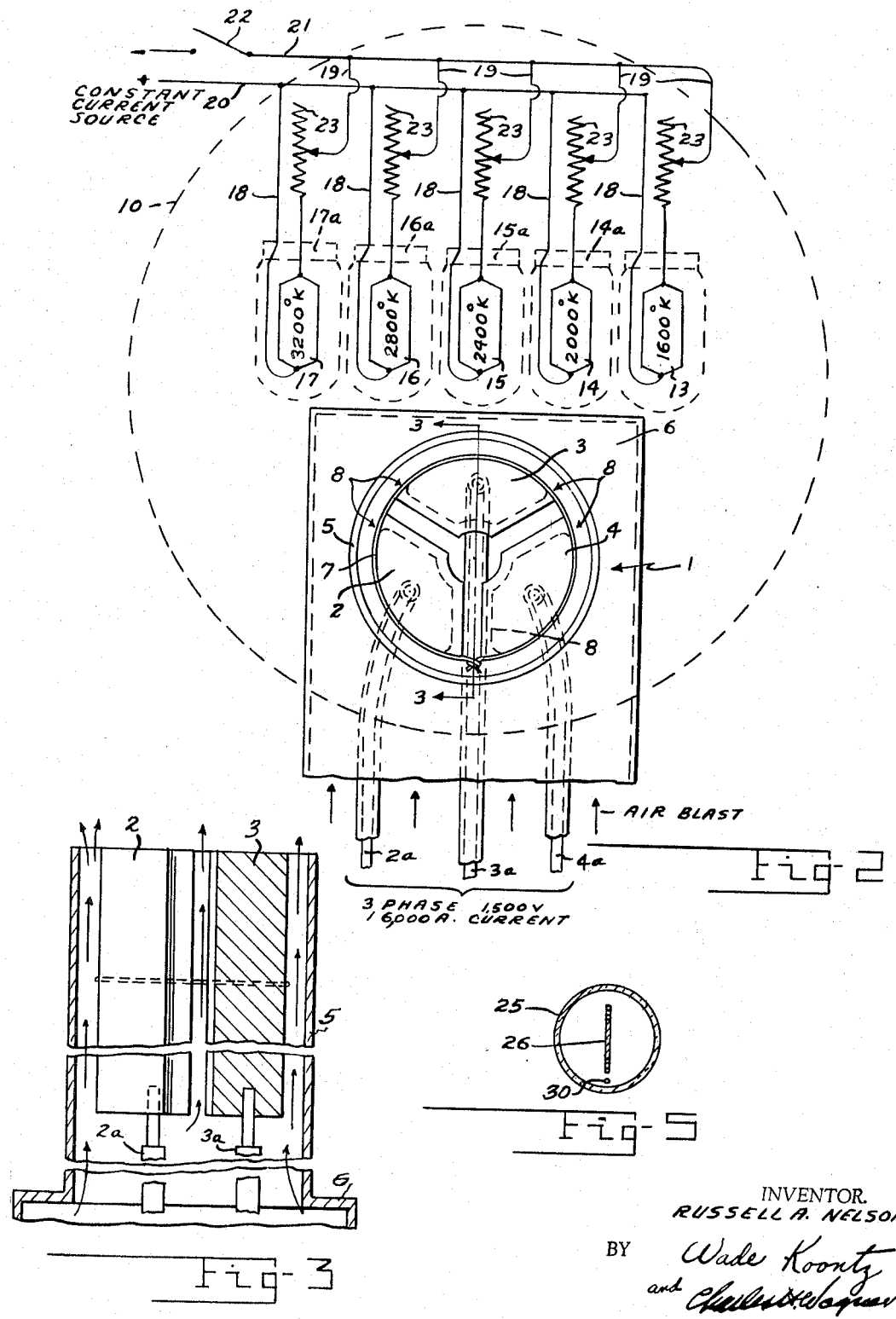

INVENTOR.
RUSSELL A. NELSON
BY Wade Koontz
Charles H. Wagner
ATTORNEYS

United States Patent Office 3,316,764
Patented May 2, 1967

3,316,764
RADIATION PYROMETER AND TEMPERATURE
STANDARD THEREFOR
Russell A. Nelson, Norristown, Pa., assignor to the United
States of America as represented by the Secretary of
the Air Force
Filed May 12, 1964, Ser. No. 366,929
2 Claims. (Cl. 73—355)

This invention relates to apparatus for measuring and recording temperatures, and more particularly to means for recording successive instaneous temperatures, particularly in connection with an object or sample which is rapidly changing its temperature.

A furtther object is the provision of an apparatus which measures and records the instantaneous temperature changes of a heated object by comparison over a predetermined period of time during which the temperature of the object may be quickly changing.

A further object is the provision of apparatus employing a high speed motion picture camera for photographing an object during changes in temperature thereof, and simultaneously photographing a plurality of different known temperature indicating means for comparison thereof with the temperature of the object, whereby the film provides a comparative measurement of the temperature in every frame and the effect of variations in emulsions from film to film or within one film are eliminated.

More particularly, the invention contemplates means for measuring and recording the rapid increase in temperature of an electric arc heated object which is supplied with high current, for instance around 1500 volts, three phase, 60 cycle power, with a current setting of, for example, about 16,000 amps, in which a plurality of electrically heated reference samples are provided which are heated by a constant current source to predetermined different degrees Kelvin, and the provision of a high speed motion picture camera taking pictures, for instance at about 1000 frames per second which include the object being heated and the reference samples already heated to different predetermined degrees Kelvin, whereby each successive frame determined a known different fraction of time and the comparison of the temperature Kelvin of the object with the temperature Kelvin recorded in each frame by any one of the reference samples determines the temperature of the object at any instance and records the substantially instantaneous rate of change in temperature of the object during the heating thereof, particularly when using "high speed infrared motion picture film."

A further object is the provision of an apparatus for successively photographing and recording the temperatures by comparison with a high speed motion picture apparatus of material tests in rocket flames, arcs, plasma jets in which the film provides an accurate record of measurement of temperature in each frame and can, therefore, record the substantially instantaneous variations or changes in temperature over a predetermined length of time, as well as to determine the changes in temperature between extremely short intervals as determined by successive frames in the film, as well as determining the rate of change in temperature by the number of frames per second being taken of the "heated object" and the constant heated comparative known temperature reference samples.

Other objects and advantages of the invention will become apparent from the following description and accompanying drawings in which like reference characters refer to like parts in the several figures.

FIG. 1 is a somewhat schematic perspective view of the apparatus and method of the invention for determining and recording rapid successive changes in temperature of an electrically heated object, such as means for creating a high temperature electric arc.

FIG. 2 is a plan view of the apparatus depicted in FIG. 1, taken on a plane below the high speed motion picture camera, illustrating the field covered in the object plane which includes the comparative reference temperature samples and the object whose changing temperature varies extremely rapidly during the high speed taking of the pictures.

FIG. 3 is a longitudinal sectional view taken approximately on the plane indicated by line 3—3 in FIG. 2, looking in the direction of the arrows.

FIG. 5 is a transverse sectional view taken about on line 5—5 of FIG. 4.

Figure 4:
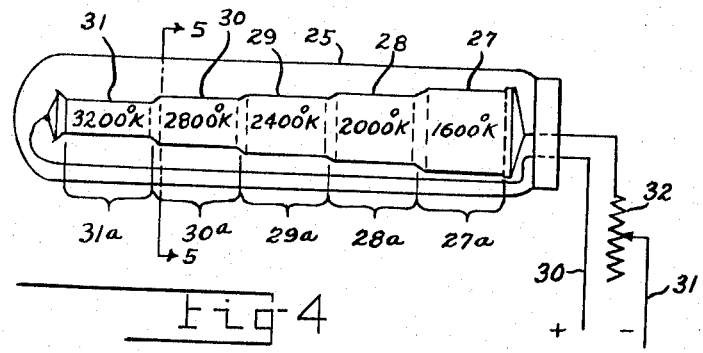
FIG. 4 is a modified embodiment of the reference temperature comparative means in which a single tube with a single electrical resistance heating element is employed to provide various comparative portions simultaneously heated to predetermined different degrees Kelvin.

The determination of changes in temperature during 10 seconds to 30 seconds duration testing is difficult where, due to extremely high heat inputs with heat sources of 8000° C. and more, temperature can rise 1000° C. per second in the first second.

By employment of this invention and method a continuous record of both the object being heated and the changes in temperature thereof can be made.

In the drawings the device or object being tested or heated, and indicated at 1, is a "high power," three phase electric arc air heater which comprises the three spaced electrode blocks 2, 3 and 4 suitably mounted in a hollow cylinder, or pipe, or stack 5 through which air is forced, preferably at a predetermined pressure or velocity by a suitable air supply or pump means (not shown), through the pressure supply conduit 6. Each of the electrode members 2, 3 and 4 is connected to one phase line 2ª, 3ª and 4ª of a three phase high power electrical current source (not shown), for instance a three phase, 1,500 volt, 16,000 ampere source.

In order to start the arc between the electrodes and the heating, when the electrodes 2, 3 and 4 are cold, a length of fine copper wire somewhat as indicated at 7 is placed to connect all three electrodes together.

Air is forced into the spaces between the electrodes 2, 3 and 4 and also into and through the space between the electrodes and the hollow cylinder 5, air preferably entering the cylinder 5 one or two feet below the top or outer ends of the cylinder 5 and the electrodes 2, 3 and 4.

When the circuit is closed through the conductors 2ª, 3ª and 4ª to establish the arc, the copper wire short circuiting connector 7 practically explodes ionizing a path between the electrodes to start the arc and heating. The upward air flow indicated by the arrows keeps the arc near or at the outer end of the electrodes 2, 3 and 4 and cylinder 5 and prevents the arc from receding back downward on the electrodes. The net result is a terrific heat rate with much heat concentrated in the areas indicated as 8 in the drawings, particularly FIG. 2. The faces of the electrodes 2, 3 and 4 may become nonuniform in temperature and the measurement of this temperature throughout the heating and the rate of change of temperature is important.

Referring to FIG. 1, a high speed motion picture camera 9 is fixed at a predetermined distance from the object 1 to be heated, and positioned to photograph the object 1, in this case the outer end of the cylinder 5 and the electrode blocks 2, 3 and 4 therein lying in the "object" plane 10 of the camera.

Also located in the object plane in the field 11 covered by the lens 12 are a plurality of reference temperature indicators 13, 14, 15, 16, 17 (etc.) which, in this form, each comprise a filament which is contained in a suitable tube or envelope 13a, 14a, 15a, 16a, and 17a, the tubes being supported in close side by side relation in any suitable manner.

Each of the temperature indicators comprises a flat elongated thin plate or filament connected at its opposite ends by conductors 18 and 19 to an energizing circuit 20 and 21 which is connected to a constant current source (not shown), a switch 22 being preferably provided for opening and closing the circuit 20–21.

Each of the connectors 19 includes a suitable resistance (preferably adjustable) such as a rheostat 23 for controlling the temperatures of the respective plates 13 to 17 when the switch 22 is closed. The rheostats 23 may be adjusted to determine the reference temperatures in degrees Kelvin of the respective filaments, for instance the filaments 13, 14 and 15 heated at 1600, 2000 and 2400 degrees Kelvin while 16 and 17 are heated to 2800 and 3200 degrees Kelvin. Also the tubes, or the plates, should be suitably marked to indicate the respective temperatures thereof in degrees Kelvin.

As before indicated, the upper or outer end of the object or sample 1 and the reference temperature means or filaments 13 to 17 are in the object plane of the motion picture camera 9 and well within the field 11 covered by the lens 12 and therefore the object 1 and the filaments 13 to 17 are sharply focused on the surface of the film in the camera 9.

In the operation the circuit 20–21 is energized and the rheostats 23 adjusted to determine the desired temperature in degrees Kelvin of the respective filaments, for instance 1600° K., 2000° K., 2400° K., 2800° K. and 3200° K. for the respective plates 13, 14, 15, 16 and 17. The high speed motion picture camera 9 is started by any suitable means, such as a control button 24, and operable over a predetermined reasonable length of time, such as for about 30 seconds or more duration at a known predetermined number of frames per second, for instance at 1,000 frames per second, each exposure then being one thousandth of a second.

During this operation the circuit to the three electrodes 2, 3 and 4 is closed to supply the desired "extremely high" A.C. input to the three phase electrical circuit 2a, 3a and 4a. For instance, the three electrodes are supplied with 1500 volt, three phase, 60 cycle power with a current setting of, for example, 16,000 amperes, air being forced into the spaces between the electrodes 2, 3 and 4 and between the hollow cylinder 5, the air entering from a suitable pump or pressure source below or inward from the outer end of the cylinder 5.

The "heavy" current causes the fine short circuiting copper wire to practically explode and establish the arc between the electrodes and the heating of the electrode elements and the air starts. The upward air flow keeps the arc near the plane being photographed by the camera 9 and the net result is a terrific heat rate with much heat concentrated in the areas 8 causing the faces of the electrodes to become nonuniform in temperature and the measurement of this is important since temperatures can raise 1000° C. per second. Such measurements were previously difficult, if not impossible, prior to applicant's apparatus and method.

The camera (preferably using infrared high speed film) records the "illumination" or comparative temperatures of the filaments 13 to 17 simultaneously with the temperature "illumination" or variations in the "illumination" during each fraction of a second on the developed film. In other words, the optical density of the developed film in the object being heated and the comparative heated filaments will provide a measure of areas of equal brightness in each frame and since the intervals between the taking of each frame is known, and the temperatures of the multiple filaments 13 to 17 are also known and constant, the comparison of the heating or heated areas in the object 1 with the reference filaments during the prolonged duration of the test provides a permanent and measurable record of temperature variation in the object 1 during the heating (and possibly the cooling thereof, if desired). The faces of the electrodes 2, 3 and 4 become nonuniform in temperature during heating which changes very rapidly, however, by comparison of the heated filaments simultaneously recorded on the film, the changes in temperature in heated areas and the rate of change can easily be determined from the film after development.

The filaments 13 to 17 may be made of any suitable heat resistant material, for instance, tungsten, molybdenum, graphite, platinum, or metals like nickel, tungsten being normally used, however, where the device or object 1 to be observed during the heating thereof is not tungsten. Also, an advantage can be obtained by making the filaments of material to match the device 1. For example, graphite could be used if graphite is under study.

It should also be noted that the developed film can be studied to any degree of precision by magnification (limited by the grain size of the film) to determine small area temperatures and changes in temperature thereof during successive small fractions of a second duration.

While in FIGS. 1 and 2 a plurality of separate comparative temperature filament 13 to 17, each in its separate transparent element is employed, it is possible and contemplated to also employ a single filament in a single transparent envelope or tube as shown in FIGS. 4 to 8.

Referring to FIGS. 4 and 5 the single envelope or tube is indicated at 25 while the single filament is denoted at 26. However, the filament 26 is progressively decreased in width as indicated at 27, 28, 29, 30 and 31 to provide areas of progressively increasing electrical resistance in the zones 27a, 28a, 29a, 30a and 31a. These may be so proportioned as to provide predetermined relative temperatures when a predetermined electric current is passed through the plate by an electric energizing circuit 30–31 which is connected to a suitable constant electrical source. The heat relationship between the plate or filament portions is established, however, a rheostat 32 may be provided for simultaneously adjusting the degree Kelvin of the portions 27, 28, 29, 30 and 31. When placed in the camera field 11 and photographed with the object 1, the operation and results are the same as described in connection with FIGS. 1–3. By proper calibration of the widths of the portions 27 to 31 and adjustment of the rheostat, the respective temperatures of these portions can be obtained respectively at 1600°, 2000°, 2400°, 2800°, and 3200° Kelvin. Changing the input changes the whole level of temperatures so that they may be raised or lowered, as desired.

The face of the ribbon 26 could be uncoated metal. The rear face could be treated by blasting, roughening, or coated with thoria, or other nonreactive to the metal oxides and ceramics to change the emissivity.

Figure 6:
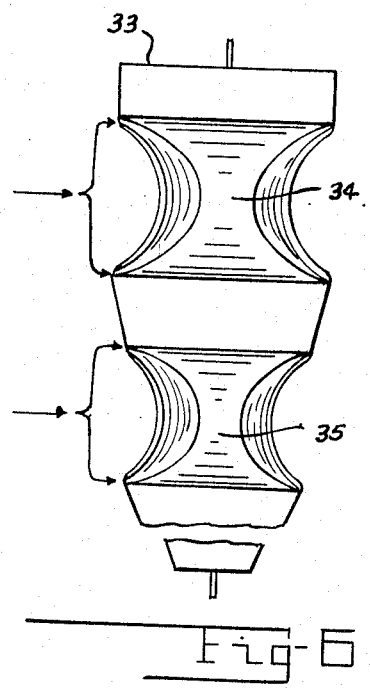
FIG. 6 is a broken away and foreshortened plan view of another type of variable resistance heating unit for causing different predetermined comparative temperatures in a metallic strip of electrical resistance material having a plurality of cup-like depressions arranged to be electrically heated to different degrees Kelvin, but omitting the enclosing transparent envelope or tube.
Figure 7:
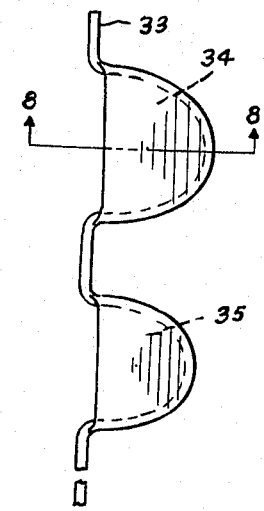
FIG. 7 is a side elevation of the Kelvin ° comparative temperature indicator shown in FIG. 6.
Figure 8:
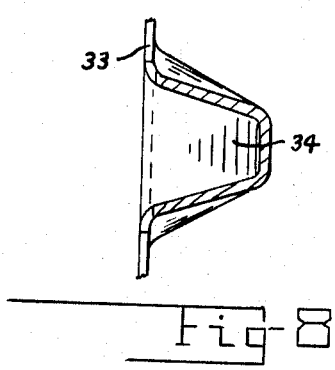
FIG. 8 is a transverse sectional view taken about on line 8—8 in FIG. 7.

As seen in FIGS. 6, 7 and 8, the multiple temperature indicating ribbon is indicated at 33, connected at its opposite end to a constant current source, the ribbon comprising a series of progressively smaller cups 34, 35, etc., so as to approximate a black body configuration when heated (a heated cavity with a small hole in one side).

The cups can be obtained by a folding process using dies. However, folding will increase temperature in certain portions and thus decrease uniformity. The cups, if used, would be formed one to a lamp (envelope) or a series of cups in one lamp. In case of a series in one lamp, the width of the ribbon would increase for the lower temperatures.

The temperature surfaces should, of course, face the camera 9, but they may be positioned similarly to the most important surfaces of the device being inspected.

The advantages are many, providing an easy rapid portable set up which can be used on materials test in rocket flames, arcs, plasma jets, and can be used for device testing for jet engines, afterburners, etc., where certain material areas must be monitored. Also, it may be possible to use the device with flames where they contain luminous particles of a composition which can be simulated by the electrically heated filaments. In certain flames, material can be introduced to give luminous particles without changing the conditions to be measured.

In some instance the presence of smoke, dust and flame between the area under study and the observer (camera) is a common disadvantage of most pyrometers. However, with the camera a wide range of possibility to eliminate some of these effects is possible. For example, by cutting off the arc in the air heater device the rate of decay in temperature in a clear (no arc) atmosphere is possible. Then by plotting the decay curve, it is possible to extrapolate back in time to the final temperature on the electrodes at the arc cutoff time.

While the use of infrared film in the camera is contemplated, the use of ultraviolet film can be employed to avoid areas of arc or flame radiation, also suitable filters may be used on the lens 12 to avoid the arc or flame radiation.

Finally, the invention provides a high speed progressive measuring and recording optical pyrometer system which is practical and satisfactory for objects having extremely rapid and progressive temperature changes over somewhat prolonged periods of time.

For purposes of exemplification, the invention has been shown and described to the best understanding thereof. However, it will be apparent that changes and modifications in the arrangement and construction of the parts thereof may be resorted to without departing from the true spirit and scope of the invention as set forth in the accompanying claims.

I claim:

1. In combination with an object subject to extremely rapid heating, a high speed motion picture camera operable at a predetermined number of frames per second, having a motion picture film therein photographically responsive to variations in color temperatures of an object being photographed, a plurality of differently heated color temperature reference indicators disposed in predetermined adjacent relation in proximity to said object to be heated, said camera fixed to simultaneously photograph on said film, said indicators and said object during the heating thereof at said predetermined number of frames per second, whereby when said film is developed said film provides a continuous progressive comparison photographic record of the changing color temperature of said object and the fixed color temperatures of the color temperature reference indicators for comparison, in which the changes in color temperature of said object on the film in each successive frame records the rate and area of change in color temperature during each predetermined fraction of a second, determined by the number of pictures taken per second, whereby a complete record of color temperature changes of the object and the rate of such changes per unit of time is accomplished in which the color temperature reference indicators comprise an elongated flat resistance heated strip connected at its opposite ends to a constant electrical source, in which the width of the strip is progressively reduced at spaced intervals throughout the length thereof to increase the electrical resistance thereof between said spaced intervals whereby to increase the color temperatures thereof to predetermined degrees Kelvin, and an enclosing envelope surrounding said strip.

2. Apparatus as set forth in claim 1 in which said strip between said intervals is recessed to provide cup shaped depressions facing the camera, whereby the color temperature in the depressions provides the reference temperature for comparison with the color temperature of the heated object.

References Cited by the Examiner

UNITED STATES PATENTS

| 1,820,219 | 7/1931 | Gall | 88—22.5 |
| 1,894,109 | 1/1933 | Marcellus | 88—22.5 X |

OTHER REFERENCES

Hall, J. A.: Photographic Photometry Applied to the Measurement of Liquid Steel Temperatures. In the Photographic Journal Section B, vol. 86B, pp. 117–132. September–October 1946, TR 1. P. 63.

Londree, J. W. Jr.: Photographic Pyrometry. In Journal of American Ceramic Society, 37 (8), pp. 354–360, August 1954.

Simmons, F. S. et al.: Photographic Technique for Measuring Temperatures in Luminous Rocket Exhaust Flames. In Journal of the Optical Society of America, 48 (10), October 10, 1958, pp. 717–721.

LOUIS R. PRINCE, *Primary Examiner.*

S. H. BAZERMAN, F. SHOON, *Assistant Examiners.*